United States Patent [19]
Cox et al.

[11] Patent Number: 5,918,249
[45] Date of Patent: Jun. 29, 1999

[54] PROMOTING LOCAL MEMORY ACCESSING AND DATA MIGRATION IN NON-UNIFORM MEMORY ACCESS SYSTEM ARCHITECTURES

[75] Inventors: John S. Cox, Lexington; John H. Waters, Columbia, both of S.C.

[73] Assignee: NCR Corporation, Dayton, Ohio

[21] Appl. No.: 08/772,039

[22] Filed: Dec. 19, 1996

[51] Int. Cl.⁶ .................................................. G06F 12/00
[52] U.S. Cl. ............................. 711/203; 711/3; 711/170
[58] Field of Search .................................. 711/203, 170, 711/3

[56] References Cited

U.S. PATENT DOCUMENTS

| | | |
|---|---|---|
| 4,703,422 | 10/1987 | Kinoshita et al. ........................ 364/200 |
| 4,991,081 | 2/1991 | Bosshart ........................................ 711/3 |
| 5,237,673 | 8/1993 | Orbits et al. ............................... 711/170 |
| 5,247,629 | 9/1993 | Casamatta et al. ....................... 395/400 |
| 5,269,013 | 12/1993 | Abramson et al. ....................... 711/170 |
| 5,452,440 | 9/1995 | Salsburg .................................... 395/463 |
| 5,784,697 | 7/1998 | Funk et al. ................................ 711/170 |

Primary Examiner—John W. Cabeca
Assistant Examiner—Nasser Moazzami
Attorney, Agent, or Firm—Gerard M. Wissing

[57] ABSTRACT

A non-uniform memory accessing (NUMA) based multi-processor system that promotes local memory accessing and data migration to local processor nodes. The system includes mechanisms to re-map virtual and physical addresses to promote local memory accessing and implements a least recently used memory allocation mechanism to age non-local memory accesses out of memory to be re-read into local memory, which promotes data migration to local memory on processor nodes.

8 Claims, 2 Drawing Sheets

PROMOTING LOCAL MEMORY ACCESSING AND DATA MIGRATION IN NON-UNIFORM MEMORY ACCESS SYSTEM ARCHITECTURES

BACKGROUND

1. Field of the Invention

The present invention relates to a memory management mechanism for applications that use data buffering mechanisms on multiprocessor systems having a non-uniform memory access (NUMA) system architecture. More particularly, the present invention provides a local memory accessing mechanism that decreases memory input-output latency by promoting the use of local memory accessing and data migration for applications in NUMA based multiprocessor systems.

2. Description of the Related Art

Some multiprocessor based systems use a plurality of processors connected to local and non-local shared memory and data storage subsystems for data storage and retrieval while running processes. In such systems, memory transactions with the non-local shared memory or data storage subsystem results in high memory input-output latency and thus, the execution times for processes running in such systems is high. In some instances, the high execution times for processes are not significant. However, in database management systems and like systems, high execution times for running processes can have a significant impact on a company's business.

One multiprocessor system architecture designed to improve memory input-output latency and thus, decrease process execution times, uses a NUMA based system architecture. In NUMA based multiprocessor systems, each processor is connected to local memory via a local bus. The processor and local memory are known as a processor node. The processor nodes of a NUMA based system are interconnected through a separate bus so that any node on the bus can access data from any other node connected to the node bus.

In NUMA based systems, a process running on a node needs to access data from local memory, as opposed to accessing data from non-local memory. Accessing data from local memory reduces memory input-output latency and the execution time of the process. Database management systems and other applications allocate a buffer cache in main memory to cache data from external storage subsystems for quick access. This buffer cache spans local memories in a NUMA system. In addition, many processes may be running at one time. After such a system starts-up, a process running on a processor node retrieves data into the memory supplying a virtual address. The operating system assigns a physical address for the data and maps the virtual address to physical memory in the NUMA system. This mapping typically remains fixed for the duration of the running process. The effect of this approach is that local memory accesses cannot be consistently maintained in database management systems and other systems where the original virtual-to-physical memory mapping may not place the retrieved data in the process' local memory or the process using the data may change from processor node to processor node.

As a result, when running processes in, for example, a database management system, where the processor node running the process can change so that when the process retrieves data the data has to be retrieved from non-local memory by the new local node. This occurs each time the process tries to retrieve the data because the mapping between the virtual addresses and the physical addresses has not changed.

To illustrate, using a banking system as a database management system where a customer wishing to make a deposit interacts with teller A, and teller A retrieves the customers account information and makes the transaction using a process running on node A. Under these circumstances, when the data is retrieved, the operating system assigns virtual addresses for the customer account data, and the virtual addresses are mapped to physical addresses which may not be associated with node A. Subsequent memory transactions are not local to node A. Even if by chance the memory assigned is local to node A, if another processor node B services another transaction or completes the first transaction, the process has to retrieve the data from the local memory of processor node A so that the new memory transaction is now non-local. As a result, the execution time of the transaction will increase.

Thus, one drawback of current NUMA based systems is that local memory accessing and data migration are not promoted.

Therefore, a need exists for a NUMA based system that promotes local memory accessing and data migration to local memory in order to decrease memory input-output latency and to decrease the execution time of the processes.

SUMMARY

The present application relates to a non-uniform memory accessing (NUMA) based multiprocessor system that promotes local memory accessing and data migration to local processor nodes. The system includes mechanisms to re-map virtual and physical addresses to promote local memory accessing and implements a least recently used memory allocation mechanism to age non-local memory accesses out of memory to be re-read into local memory, which promotes data migration to local memory on processor nodes.

The present application also relates to a method for managing memory accesses in NUMA based multiprocessor systems, wherein physical memory addresses are assigned for virtual addresses of data associated with processes running on the system. The method includes running a process on a processor node in the system, determining if physical memory addresses for data to be retrieved by the process running on the processor node are local to the processor node, and re-assigning physical memory addresses corresponding to local memory of the processor node, for data to be retrieved by the process running on the processor node, to the virtual addresses of the data if the physical memory addresses are non-local addresses. Typically, an operating system of the system re-assigns the physical memory addresses.

The method further includes determining if the re-assigned physical memory has available space to store the data, and purging data from re-assigned physical memory associated with the re-assigned physical memory addresses if space to store the data is unavailable. Preferably, the data is purged from the re-assigned physical memory using a least recently used memory allocation method, where the data stored in the re-assigned memory is time stamped and the least recently used method purges data having the oldest time stamp.

BRIEF DESCRIPTION OF THE DRAWINGS

Preferred embodiments of the invention are described hereinbelow with reference to the drawings wherein.

DETAILED DESCRIPTION

Figure 1:
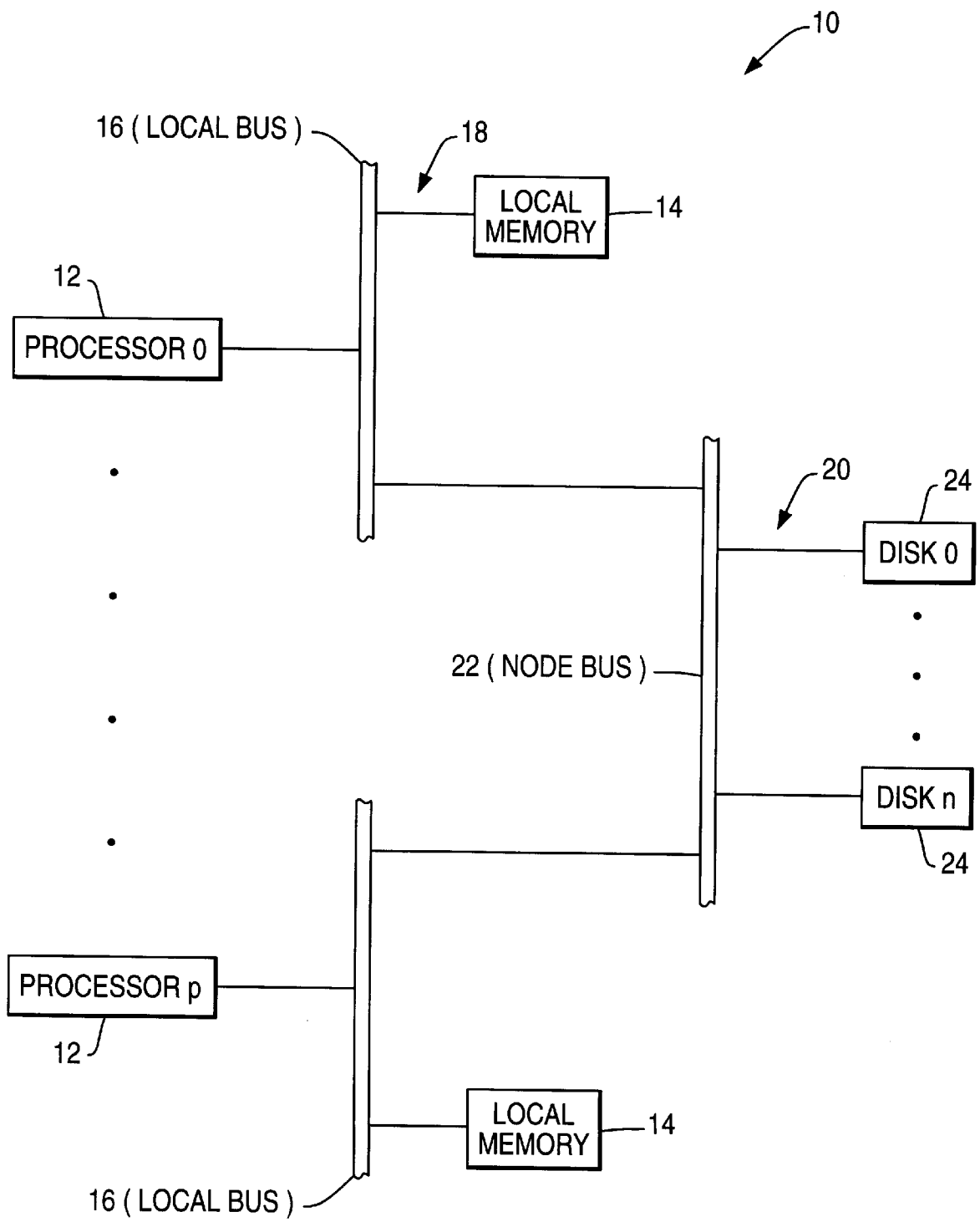
FIG. 1 is a block diagram of one embodiment of a NUMA based multiprocessor system architecture.

Referring to FIG. 1 an exemplary NUMA based multiprocessor systems that can be used as, for example, a database management system is shown. In the multiprocessor system 10 of FIG. 1, a plurality of processors 12 each of which are connected to local memory 14 through a local bus 16. A processor node 18 includes a processor 12 and the corresponding local memory 14 and local bus 16. The processor nodes 18 are interconnected to a data storage subsystem 20, such as disks 24, and each other via node bus 22. In this configuration, each processor node can retrieve data from any other processor node or from the data storage subsystem.

Figure 2:
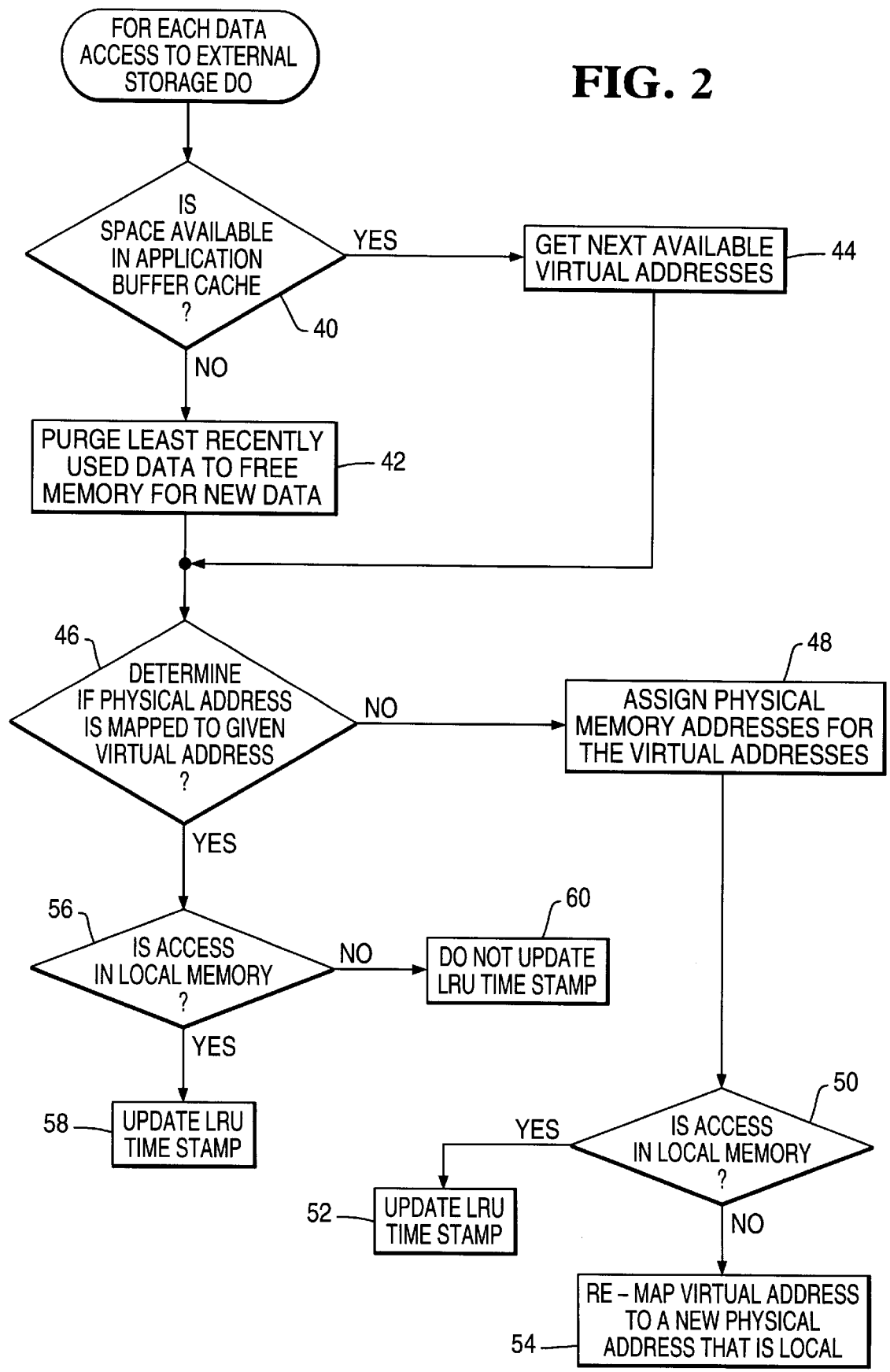
FIG. 2 is a flow diagram for the operation of the NUMA based system according to the present invention.

Referring to FIG. 2, a flow diagram of the operation of the system of the present application is shown. In database management and other applications that allocate a cache in main memory to temporarily store data from external subsystems, the buffer cache memory 14 typically has a limited capacity. In operation, when a process running on a processor node 18 retrieves data into the application cache for the first time and the cache connected to the processor does not have sufficient capacity available to store the new data (step 40), then previously stored data has to be removed from the application cache in order to free-up memory space (step 42). The mechanism discussed in the present application determines what data will be purged (or overwritten) from the local memory based on a least recently used (LRU) memory management mechanism. The LRU memory management mechanism stores the most recently retrieved (or used) data in the local memory, and overwrites the oldest data in the local memory. Typically, when data is stored in the local memory the local processor time stamps the data. Thus, the data stored in the memory with the oldest time stamp will typically be overwritten. When space is available in the buffer cache (step 40) the process assigns the next available virtual address, to the data (step 44).

When a process (process A) running on a processor node (e.g. processor node A) seeks to retrieve data for the process into the application cache at a given virtual address the operating system determines if physical addresses have been assigned for the virtual addresses (step 46). If physical addresses have not been assigned for the virtual addresses, the operating system assigns physical memory addresses for the data which is located in the local memory of processor node A where the data is to be stored (step 48). If virtual-to-physical mapping exists for the given virtual address and the physical address is not local to the node (step 50), the operating system will re-map a new physical address to the given virtual address which is on the local node (step 54). If the physical address is local to the node (step 50), the application determines if the local memory has sufficient capacity available to store the data, similar to step 40. If there is not enough memory space available in the buffer cache LRU data is purged, similar to step 42. Once the LRU data is purged or if space is available to store the data, the application process on node A retrieves, time stamps and stores the data in memory (step 52).

Returning to step 46, if virtual addresses have been assigned to the data, the local processor node determines if the data is stored in local memory (step 56). If the data is in local memory the data is retrieved as a local memory transaction and the LRU time stamp is updated (step 58). If the data is not in local memory, then a new processor node (e.g., processor node B) is servicing the process and the LRU time stamp is not updated (step 60). This will systematically age the data out of the application cache. When the data is accessed again it will be read into local memory at the accessing process.

In this configuration, if the process A again retrieves the same data, the system of the present application determines where the data is stored and which processor node is servicing the process. If processor node A continues to service process A, the memory transactions should remain local to processor node A. If processor node A no longer is the processor node servicing process A, then the memory access is no longer local. The system then retrieves the data into the local memory of the new processor node (processor node B) servicing process A. When processor node B retrieves the data, the processor node B re-maps physical memory addresses in the local memory of processor node B to the virtual memory of process A. The data stored in the local memory of processor node B is time stamped to indicate when the data was saved. As noted, if the process running on processor node B retrieves new data for process A or for a new process, then existing data stored in the local memory of processor node B may have to be purged. As noted, data with the oldest time stamp is removed (or overwritten). These operational characteristics promote local memory accessing because the remapping of the virtual and physical memory addresses. These characteristics also promote data migration because existing data stored in the local memory of a processor node is eventually purged therefrom unless the local processor again tries to retrieve the data, at which time the data will receive a new time stamp.

The system of the present application is effective in reducing memory input-output latency because memory requests by a processor node are assigned to the local memory of the processor node making the request. Another reason that the system of the present application is effective in reducing memory input-output latency is because the probability of a request for the same data is highest right after the initial request. That is, the probability of re-requests for the same data diminishes as the time interval from initial request increases. Thus, purging the local memory of data that is the oldest data stored in the local memory promotes data migration.

It will be understood that various modifications can be made to the embodiments of the present invention herein without departing from the spirit and scope thereof. For example, various types of processors and local memory can be used. Moreover, the subject matter of the present invention may be applied to various embodiments of the NUMA based multiprocessor system design. Therefore, the above description should not be construed as limiting the invention, but merely as preferred embodiments thereof. Those skilled in the art will envision other modifications within the scope and spirit of the invention as defined by the claims appended hereto.

What is claimed is:

1. A method for managing memory accesses in a NUMA based multiprocessor system including a plurality of processor nodes each having at least one processor and memory associated with the at least one processor, and a data storage subsystem, that promotes local memory accessing and migration of data to be retrieved by a process to a processor node running the process, the method comprising:

running a process on a processor node in the system;

determining if physical memory addresses for data to be retrieved by the running process is in the memory associated with the processor node; and re-assigning physical memory addresses corresponding to the memory of the processor node running the process for the data to be retrieved by the process running on the processor node to the virtual addresses of the data, if the physical memory addresses do not correspond to the memory associated with the processor node running the process.

2. The method according to claim 1, wherein an operating system of the system re-assigns the physical memory addresses.

3. The method according to claim 1 further comprising:

determining if the re-assigned physical memory has available space to store the data; and purging data from re-assigned physical memory associated with the re-assigned physical memory addresses if space to store the data is unavailable.

4. The method according to claim 3, wherein the data is purged from the re-assigned physical memory using an LRU method.

5. The method according to claim 4, wherein data stored in the re-assigned memory is time stamped and the LRU method purges data having the oldest time stamp.

6. A non-uniform memory accessing (NUMA) based multiprocessor system that promotes local memory accessing and data migration of data used by a process to a processor node running the process, comprising:

a plurality of processor nodes interconnected through a common bus, each processor node having at least one processor and memory associated with the at least one processor; and a memory management mechanism to re-map virtual and physical memory addresses such that memory accessing by a process running on one of the plurality of processor nodes is to the memory associated with the processor node running the process, and to implement a least recently used memory allocation mechanism to remove aged data in the memory space associated with the re-mapped physical memory addresses if the space is unavailable.

7. A non-uniform memory accessing (NUMA) based multiprocessor system that promotes local memory accessing and data migration of data used by a process to a processor node running the process, comprising:

a plurality of processor nodes interconnected through a common bus, each processor node having at least one processor and memory associated with the at least one processor; and a memory management means for re-mapping virtual and physical memory addresses such that memory accesses by a process running on one of the plurality of processor nodes is to the memory associated with the processor node running the process, and for removing aged data in the memory associated with the processor node running the process if memory space associated with the re-mapped physical memory addresses is unavailable.

8. The system according to claim 7, wherein said memory management means uses least recently used memory allocation means for removing the aged data in the memory associated with the processor node running the process if the memory space associated with the re-mapped physical memory addresses is unavailable.

* * * * *